United States Patent
Schlichter (10) Patent No.: US 9,069,539 B2
(45) Date of Patent: Jun. 30, 2015

(54) METHOD AND SYSTEM FOR FURNISHING POWER AND DATA FROM POWER SOURCING EQUIPMENT TO POWERED DEVICE

(75) Inventor: Timothy James Schlichter, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 225 days.

(21) Appl. No.: 13/355,175

(22) Filed: Jan. 20, 2012

(65) Prior Publication Data

US 2013/0191654 A1 Jul. 25, 2013

(51) Int. Cl.
*G06F 1/00* (2006.01)
*H04M 1/00* (2006.01)
*G06F 1/26* (2006.01)
*G06F 1/32* (2006.01)

(52) U.S. Cl.
CPC .............. *G06F 1/266* (2013.01); *G06F 1/3203* (2013.01)

(58) Field of Classification Search
CPC .................................................... G06F 1/3203
USPC ......................................................... 713/300
See application file for complete search history.

(56) References Cited

U.S. PATENT DOCUMENTS

| | | | |
|---|---|---|---|
| 7,117,272 B2 | 10/2006 | Rimboim et al. | |
| 7,299,368 B2 | 11/2007 | Peker et al. | |
| 7,313,714 B1 | 12/2007 | Helfinstine et al. | |
| 7,373,532 B2 | 5/2008 | Schindler | |
| 7,449,796 B2 | 11/2008 | Elkayam et al. | |
| 7,471,014 B2 | 12/2008 | Lum et al. | |
| 7,490,251 B2 | 2/2009 | Lum et al. | |
| 7,509,505 B2 | 3/2009 | Randall et al. | |
| 7,516,340 B2 | 4/2009 | Landry et al. | |
| 7,548,799 B2 | 6/2009 | Landry et al. | |
| 7,593,756 B2* | 9/2009 | Ferentz et al. | 455/572 |
| 7,603,570 B2 | 10/2009 | Schindler et al. | |
| 7,631,201 B2 | 12/2009 | Hansalia | |
| 7,693,076 B2 | 4/2010 | Karam | |
| 7,774,628 B2 | 8/2010 | Hansalia | |
| 7,793,124 B2 | 9/2010 | Landry et al. | |
| 7,960,860 B2 | 6/2011 | Apfel | |
| 7,978,845 B2* | 7/2011 | Caveney et al. | 379/413 |
| 2006/0109728 A1 | 5/2006 | Dwelley et al. | |
| 2006/0112288 A1* | 5/2006 | Schindler | 713/300 |
| 2006/0168458 A1 | 7/2006 | Stineman et al. | |
| 2006/0210057 A1* | 9/2006 | Stanford | 379/413 |
| 2007/0278857 A1 | 12/2007 | Robbins | |
| 2007/0284941 A1 | 12/2007 | Robbins | |
| 2007/0288771 A1 | 12/2007 | Robbins | |

(Continued)

OTHER PUBLICATIONS

Schlichter, Tim, U.S. Appl. No. 13/355,246, entitled "Method and System for Furnishing Backup Power and Data from Power Sourcing Equipment to Powered Device," filed Jan. 20, 2012.

(Continued)

*Primary Examiner* — Suresh Suryawanshi
(74) *Attorney, Agent, or Firm* — Maynard Cooper & Gale, P.C.; Jon E. Holland (57) ABSTRACT

A power sourcing equipment is connected to a powered device via a cable. The power sourcing equipment is configured to provide power to different types of devices. The power sourcing equipment has a control system for determining the type of powered device that is connected to the cable and furnishes power in response to the determination. Also described is a powered device capable of establishing communication with PSEs of multiple types.

26 Claims, 11 Drawing Sheets

(56) References Cited

U.S. PATENT DOCUMENTS

2009/0041004 A1 2/2009 Emmanuel
2010/0277293 A1 11/2010 Yu et al.
2011/0283118 A1 11/2011 Maniktala

OTHER PUBLICATIONS

Schlichter, et al., U.S. Appl. No. 13/355,268, entitled "Device and Method for Powering Ethernet Midspan Device and Endspan Device," filed Jan. 20, 2012.

* cited by examiner

PRIOR ART

METHOD AND SYSTEM FOR FURNISHING POWER AND DATA FROM POWER SOURCING EQUIPMENT TO POWERED DEVICE

RELATED ART

There is currently a growth of local area networks (LANs) and wide area networks (WANs) based on Ethernet technology. Many enterprises, offices, and homes have cables comprising multiple twisted wire pairs, such as a Category 5 cable, that serve as communication connections for Ethernet devices. Ethernet equipment that is coupled to the cable often has a communication device that supplies both data and power over the cable to another communication device, such as an Internet Protocol (IP) telephone, a wireless LAN access point, a camera or other such device. When Ethernet devices are connected so that power and data are delivered from one device to another device over the cable, the system is called a power over Ethernet (PoE) system.

Many LANs are implemented as Ethernet systems in accordance with various standards, such as IEEE standards that describe PoE system requirements. However, as standards evolve, it is often necessary for nonstandard equipment and/or legacy equipment to operate as communication devices within an Ethernet system. A problem occurs when a one-pair Ethernet-powered device with one power arrangement or a two-pair Ethernet-powered device with a different power arrangement may be connected to a device that furnishes power and data. The device that furnishes both power and data over the cable is called power sourcing equipment (PSE). An Ethernet switch with PSEs typically has multiple output ports, for example 24 ports. Cables extending from the output ports terminate at a connection jack. The jack is available for connection to a powered device (PD), such as a one-pair Ethernet PD or a two-pair Ethernet PD. A one-pair Ethernet PD connected to the Ethernet switch receives power and data over one pair within the cable, and a two-pair Ethernet PD receives power and data over two pairs within the cable. An enterprise, owning a PD, often desires to connect either a one-pair device, a type-1 device, or a two-pair device, a type-2 device to the jack. However, if a PSE within the switch is designed for power and data delivery to a type-1 device, the PSE will not work with a type-2 device. Further, if a PSE within the switch is designed for power and data delivery to a type-2 device, the PSE will not work with a type-1 device. If the user knows a priori which jacks work with type-1 and which jacks work with type-2 and the user can make a correct connection, the Ethernet communication system will function properly.

Enterprises often desire to continue communication with their currently owned equipment, such as a type-1 PD, while upgrading to a type-2 PD when it is desirable. Consequently, it is possible to inadvertently couple a one-pair PD to a cable connected to a PSE designed for providing power and data over two pairs. Such a connection will not provide Ethernet data communication. In order for an Ethernet communication system to work properly, a type-1 PD should be coupled to a type-1 PSE, and a type-2 PSE should be coupled to a type-2 PD.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

In order for an Ethernet power sourcing equipment (PSE), that is cable connected to an Ethernet powered device (PD), to provide communications, the PSE and PD generally should be of the same type, i.e., a type-1 or a type-2. An adaptive PSE, as disclosed herein, is a device that may function as any of a plurality of types, e.g., either a type-1 or a type-2, PSE depending on the type of PD to which it is connected. When a PD, that may be of type 1 or type 2, is connected to the adaptive PSE, a detector within the adaptive PSE determines if the connected powered device is a type-1 PD. If the PD is a type-1 device, then the adaptive PSE activates a power switch that connects a supply voltage (a DC voltage) to a wire pair designated to furnish power to a type-1 powered device. If the PD is not a type-1 device, then the switch is not activated and remains an open circuit to the power supply. Another detector within the adaptive PSE determines if the connected PD is a type-2 device. If the PD is a type-2 PD, then the adaptive PSE activates another power switch that connects the supply voltage to wire pairs designated to furnish power to a type-2 device. Further, if the detectors determine that neither a type-1 nor a type-2 PD is connected, then neither of the power switches is activated and power is not applied to any wire pairs of the cable.

Another technique to establish data communications over a cable connecting a PSE of any type, e.g., a type-1 or a type-2, to a PD is to provide a PD that is configured to accept power and data from either type of PSE. An adaptive PD, as disclosed herein, functions as any of a plurality of types, e.g., a type-1 PD and a type-2 PD depending on the type of PSE to which it is connected. Hence, the adaptive PD is configured to establish communications with either a type-1 PSE or a type-2 PSE. The adaptive PD comprises an interface coupled to an adaptive circuit over a first path and a second path. The first path of two conductors is coupled to one pair of the cable and the second path of two conductors is coupled to two-pairs of the cable. The adaptive circuit connects a predetermine resistance, such as approximately 25 kΩ, to both the first path and the second path. When a type-1 PSE sends a probe signal for PD detection, the adaptive PD functions as a type-1 PD; and when a type-2 PSE sends a probe signal for PD detection, the adaptive PD functions as a type-2 PD. Upon detecting a PD of either type, the PSE applies a supply voltage via the cable to the adaptive PD. When the adaptive PD receives the supply voltage, the adaptive circuit applies the supply voltage to a converter voltage that activates communication circuits. The communication circuits, including a transceiver, then establish data communications with similar circuits in the PSE.

Figure 1:
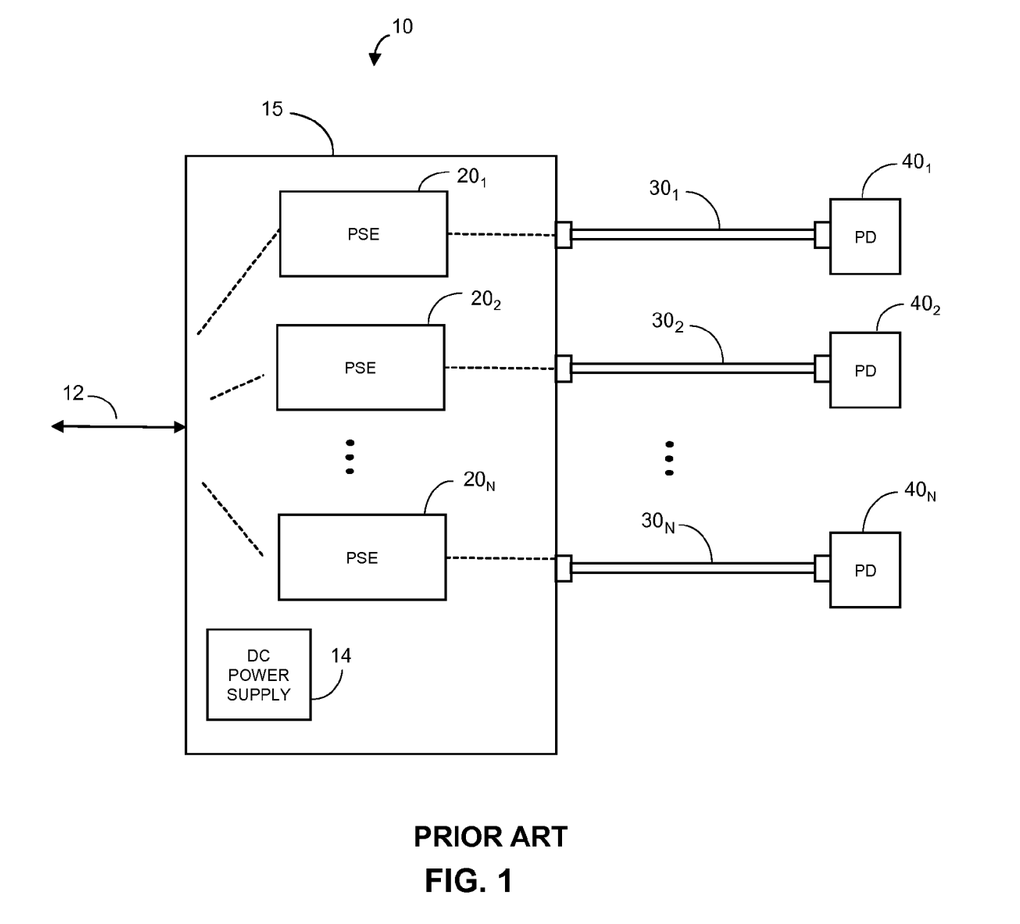
FIG. 1 is a block diagram of a conventional Ethernet data communications system.

FIG. 1 depicts an Ethernet communication system 10 comprising a switch 15 having multiple PSEs 20, wherein each PSE 20 is connected to a respective PD 40. The switch 15 is coupled to an upstream data source (not shown) via a source channel 12, such as a cable or optical fiber, for transferring data to and from the upstream data source. The switch 15 is referred to as a power sourcing switch due to the power sourcing functionality provided by the PSEs 20, as will be described in more detail hereafter. Each PSE 20 is coupled to a respective PD 40 over a Category 5 cable 30. Other types of cables are possible in other embodiments. In order for a PSE 20 and PD 40 to provide reliable Ethernet service, the units should be of the same type. If a PSE 20 is designed for a one-pair system, a type-1 PSE, then the PD should be a type-1 device. If all PSEs 20 of switch 15 are type 1, then for reliable data connections, each PD should be type 1. Hence, if a type-1 PD is replaced by a type-2 PD, transferring data is not possible since a type-1 PSE is not compatible with a type-2 PD.

Figure 2:
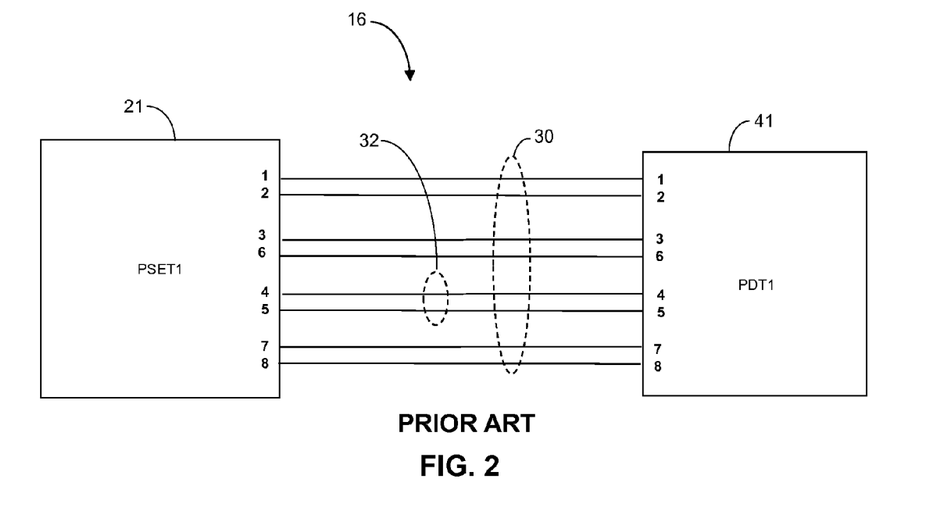
FIG. 2 depicts a first type of power arrangement for an Ethernet connection.

FIG. 2 depicts a conventional PoE system 16, wherein a type-1 PSE (PSET1) 21 is coupled to a type-1 PD (PDT1) 41 over a 4-pair cable 30, such as a Category 5 cable. For a type-1 connection only a one pair 32 (e.g. wires 4 and 5) is used to couple the PSET1 21 to the PDT1 41 for simultaneously delivering power and transferring data. When the PDT1 41 is installed, a detector (not shown) within a controller of the PSET1 21 determines if a PDT1 41 is connected. If so, then a power switch comprising, for example, one or more FETs, receives a control signal from the detector. Upon receipt of the control signal, the switch provides a connection for delivery of a supply voltage from a power supply over wires 4 and 5 as a differential pair. The power supply in a PSE is a direct current (DC) power supply and has a plus voltage, DC+, and a negative voltage, DC−, which may be connected to wire 4 and wire 5 respectively. When PDT1 41 receives the supply voltage and activates communication circuits, data transfers proceed. If the PSET1 21 does not detect a PDT1 41, either because there is no unit attached or because a non-matching unit is attached, then data communication is not available. Generally, when a type-1 PSE is connected to a type-1 PD over one pair of cable 30, other pairs of cable 30 are unused, i.e., neither power nor data is applied to any of the other pairs. However, other conventional systems may supply power over one pair and transfer data over more than one pair.

Figure 3:
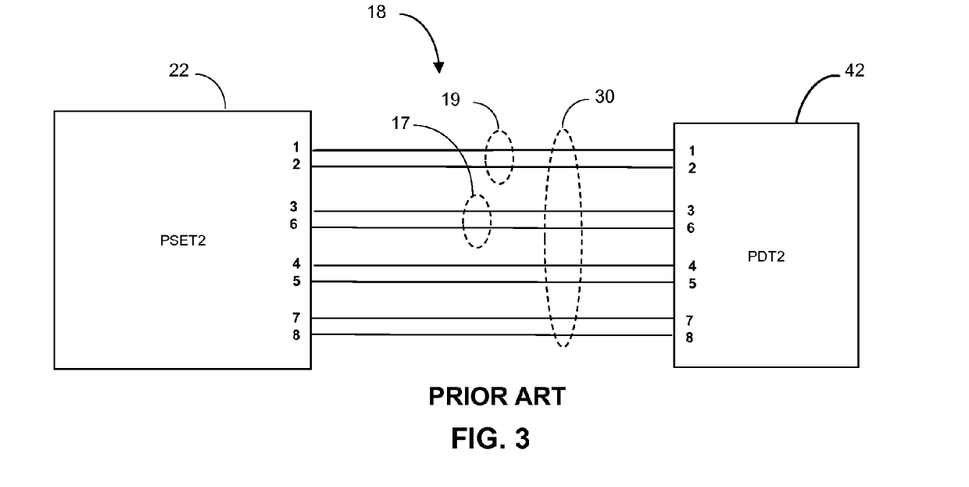
FIG. 3 depicts a second type of power arrangement for an Ethernet connection.

FIG. 3 depicts another conventional PoE system 18, wherein a type-2 PSE (PSET2 22) is coupled to a type-2 PD (PDT2 42) over a 4 pair cable 30. A type-2 connection requires two pairs 17 and 19 (i.e., wires 3 and 6 and wires 1 and 2, respectively), to couple the PSET2 22 to the PDT2 42 for delivering power and transferring data. When the PDT2 42 is installed, i.e., initially connected to cable 30, a detector (not shown) within a controller of the PSET2 22 determines if a PDT2 42 is connected. If so, then a power switch receives a control signal from the detector. Upon receipt of the control signal, the power switch provides a path for the supply voltage from the power supply using the two wire pairs 17, 19. For the system of FIG. 3, wires 1 and 2 are connected to DC− and wires 3 and 6 are connected to DC+, thereby providing power in a common mode connection. When the PDT2 42 receives the supply voltage and activates communication circuits, data transfer proceeds. Data is transferred on pairs 17 and 19 in a differential mode. If the PSET2 22 does not detect a PDT2 42, either because there is no unit attached or because a non-matching unit is attached, then data communication is not available. Generally, when a type-2 PSE is connected to a type-2 PD over two pair of cable 30, other pairs of cable 30 are unused, i.e., neither power nor data is applied to any of the other pairs. However, other conventional systems may supply power over two pairs and transfer data over more than two pair.

Figure 4:
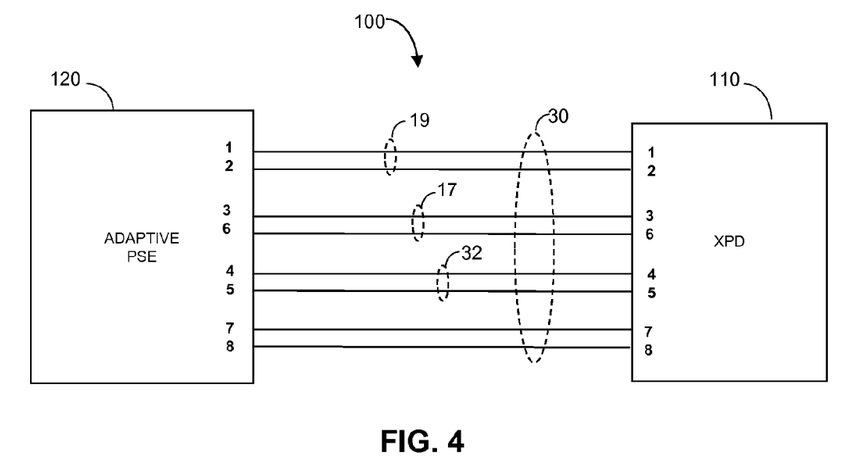
FIG. 4 is a block diagram depicting an exemplary embodiment of a powering system in accordance with the present disclosure.

FIG. 4 depicts an embodiment of PoE system 100 in accordance with the present disclosure. An adaptive PSE, APSE 120, is coupled by cable 30 to a type-X PD, XPD 110, wherein X designates the type of PD. For example, when the PD 110 is a type-1 device X is "1" and when the PD 110 is a type-2 device X is "2". When the APSE 120 is connected to the XPD 110 over cable 30, the APSE 120 is capable of determining the type of powered device connected to the cable 30. Once the type of powered device is determined and power is provided to the XPD 110, data may be transferred between the devices. The PoE system 100 is capable of providing power and data to either a type-1 device or a type-2 device.

Figure 5:
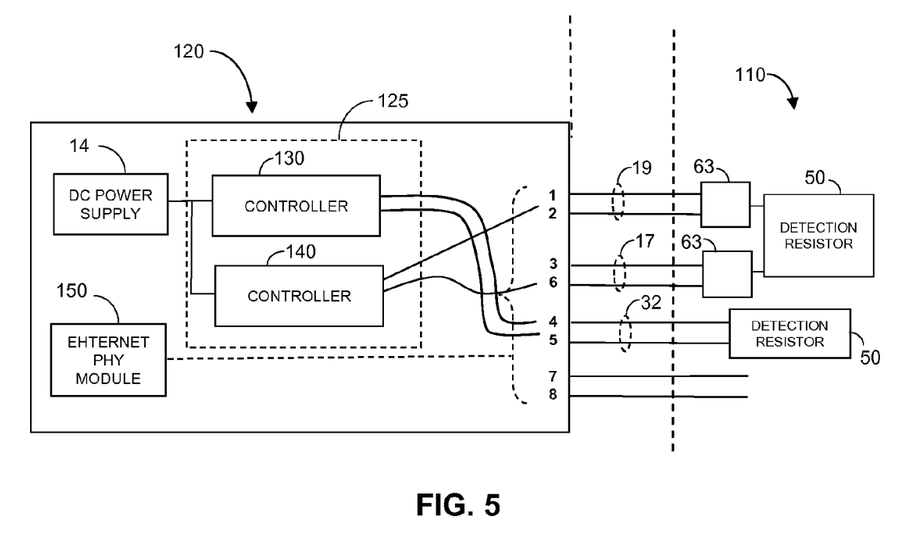
FIG. 5 depicts an exemplary embodiment of a controller for the powering system of FIG. 4.

An embodiment of APSE 120 comprises a control system 125 and a power supply 14 as depicted in FIG. 5. The control system 125 comprises a controller 130 and a controller 140. The controller 130 has a detector 132 (FIG. 6) for determining if a type-1 PD is connected to wires 4, 5 of cable 30. The detector 132 (FIG. 6) may be an off-the-shelf detector available from an Ethernet chip vendors or may be a custom detection circuit. Detection is accomplished by determining if the resistance across wires 4, 5 is within a predetermined range, such as approximately 25 kΩ, as depicted by detection resistor 50. The 25 kΩ resistance is a value specified in an IEEE standard explicitly for determining if a PD is connected to a wire pair. For example, if the resistance across wires 4, 5 is zero, a short circuit, then the detector 132 determines that there is no PD connected to the wires. If the resistance across wires 4, 5 is large, e.g., an open circuit, then the detector 132 also determines that a PD is not connected. If the detector 132 determines that 25 kΩ is connected across wires 4, 5, then the XPD 110 is deemed to be a type-1 device and receives a supply voltage from power supply 14 over wires 4, 5. However, if the resistance across wires 4, 5 is not within a desired tolerance of the 25 kΩ, then the XPD 110 does not receive power over wires 4, 5.

Controller 140 has a detector 142 (FIG. 6) wherein one port of the detector 142 is DC coupled to wires 1 and 2 (i.e., wire pair 19) and the second port is DC coupled to wires 3 and 6 (i.e., wire pair 17) providing a common mode connection. If controller 140 detects a resistance of 25 kΩ, then controller 142 connects DC− to wires 1 and 2 (i.e., wire pair 19) and DC+ to wires 3 and 6 (i.e., wire pair 17) of cable 30. Detection resistor 50 is DC coupled to wire pairs 19 and 17 through center taps of a center-tap transformers 163 as will be seen when viewing FIG. 6. Depending on the type of powered device connected to the APSE 120, a DC power supply 14 furnishes a supply voltage to the XPD 100 over one pair 32 or the two pairs 19, 17. In one embodiment, the controller 130 and the controller 140 are components available from manufacturers. In other embodiments, the controllers comprise well known current detector circuits and power switches. For other embodiments other circuits are possible. Data transfers between the APSE 120 and the XPD 110 over the cable 30 are provided by a respective Ethernet PHY module 150 in each device. In one embodiment, if the control system 125 does not detect either a type-1 PD or a type-2 PD, then a notification is sent to system manager (not shown), such as an Ethernet controller indicating there is no recognizable powered device connected to the APSE 120. In other embodiments, the control system 125 may be configured to accommodate other types of devices or respond to an unrecognizable device type in a different manor.

Figure 6:
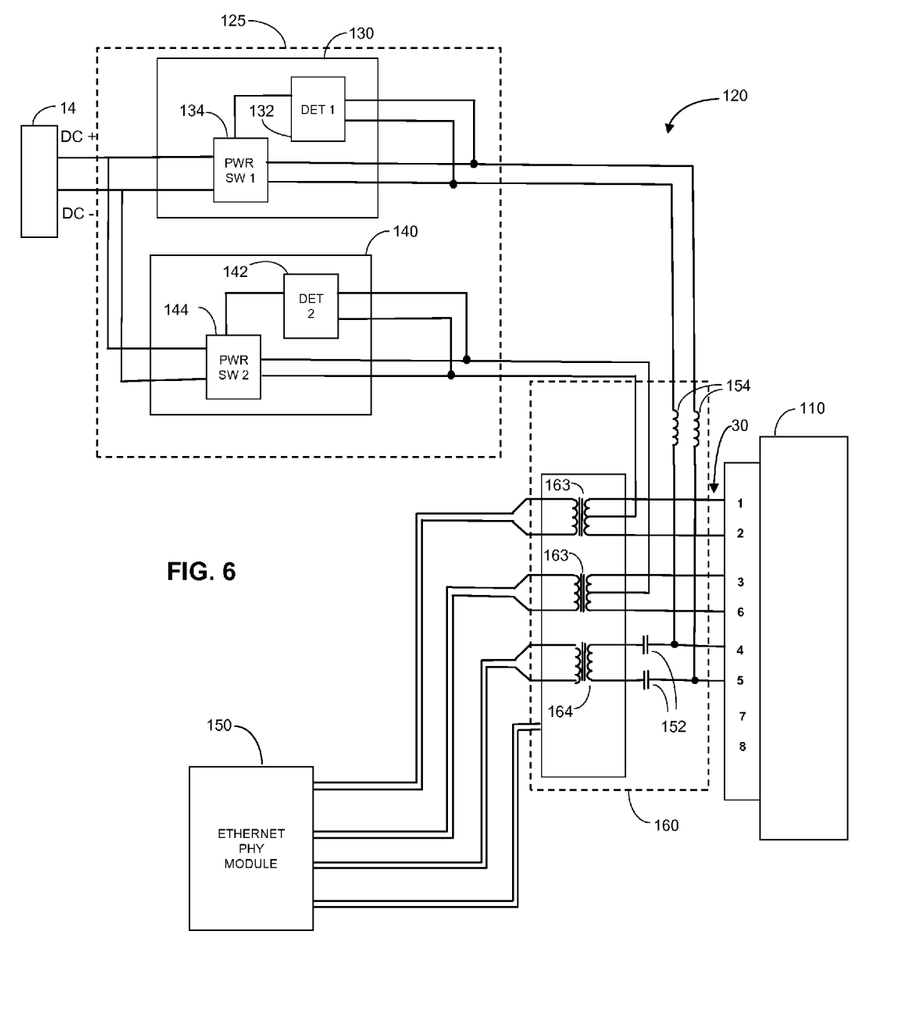
FIG. 6 depicts an exemplary embodiment of the controller of FIG. 5 connected in an Ethernet arrangement.

FIG. 6 depicts an exemplary embodiment of an APSE 120. An interface 160 of the APSE 120 comprises center-tap transformers 163, transformer 164, inductors 154 and capacitors 152. The interface 160 is configured to provide DC coupling for power transfer and high-frequency coupling for data transfer. The control system 125 of the APSE 120 comprises a controller 130 having a detector 132 and a power switch 134. The detector 132 is connected to wires 4 and 5. A plurality of capacitors 152 are provided to DC isolate the detector 132 from the secondary windings of data transformer 164. If the detector 132, based on Ethernet standards, detects that XPD 110 is a type-1 powered device, then a control signal is provided to power switch 134. The power switch 134 is activated in response to the control signal and provides a differential mode DC path for a supply voltage from power supply 14 to the XPD 110 as depicted in FIG. 6. In this regard, if a type-1 PD is not detected then the power switch 134 is not activated and is open circuit to the power supply 14 thereby blocking power to the XPD 110 over wires 4 and 5. Two inductors 154 are placed in the circuit to prevent data signals from entering the controller 130. After the type-1 XPD 110 is activated, data may be transferred between the XPD 110 and the APSE 120 across wires 4 and 5 via Ethernet PHY module 150. If a type-1 PD is not detected, then a controller 140 of control system 125 determines if the XPD 110 is a type-2 device.

The controller 140 comprises a detector 142 and a power switch 144 that are coupled to the center tap windings of data transformers 163. The detector 142 detects if a type-2 powered device is coupled to wires 1 and 2 (i.e., wire pair 19) and wires 3 and 6 (i.e., wire pair 17). If so, then the detector 142 sends a control signal to the power switch 144. In response, the power switch 144 provides a connection for DC− to wires 1 and 2 (i.e., wire pair 19) and a connection for DC+ to wires 3 and 6 (i.e., wire pair 17). After the XPD 110 is activated, Ethernet PHY Module 150 transfers data to and from the XPD 110 differentially across wire pair 19 and differentially across wire pair 17. If a type-2 PD is not detected and a type-1 PD is not detected as described above, then the control system 125 provides a notification signal to an Ethernet managing controller (not shown).

Figure 7:
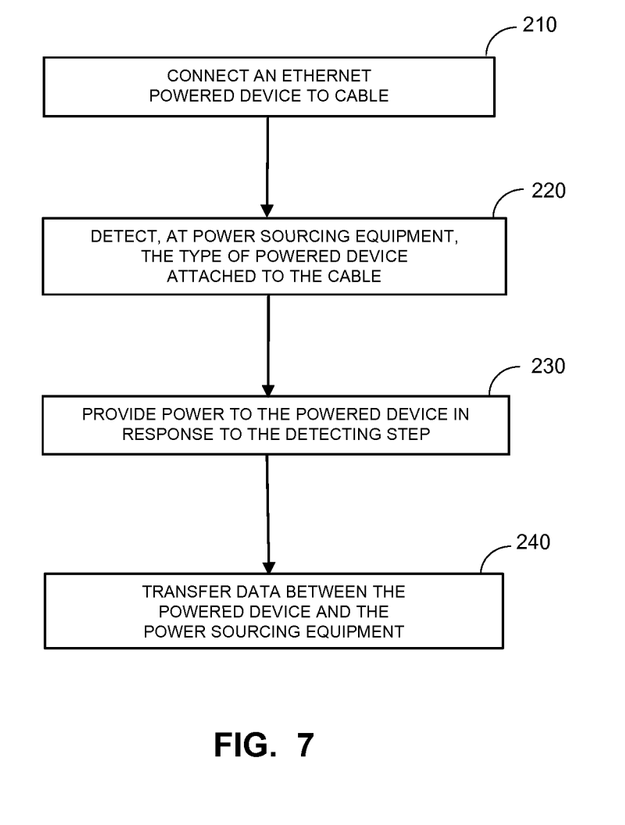
FIG. 7 is a flowchart illustrating an exemplary method of establishing communications between a powered device and adaptive power sourcing equipment.

An exemplary embodiment for establishing communication between an APSE 120 and an XPD 110 is depicted by FIG. 7. Output ports of an Ethernet switch having APSEs 120 are coupled by cables to XPDs 110. When an XPD 110 is connected to an APSE 120, then a connection is established, as shown by block 210. Within the Ethernet switch, the respective APSE 120 detects the type of powered device that is connected to the output port of the Ethernet switch, as shown by block 220. In response to the detection, power is provided to the powered device, as shown by block 230. After the powered device is activated, data is transferred between the powered device and the power sourcing equipment, as shown by block 240.

Figure 8:
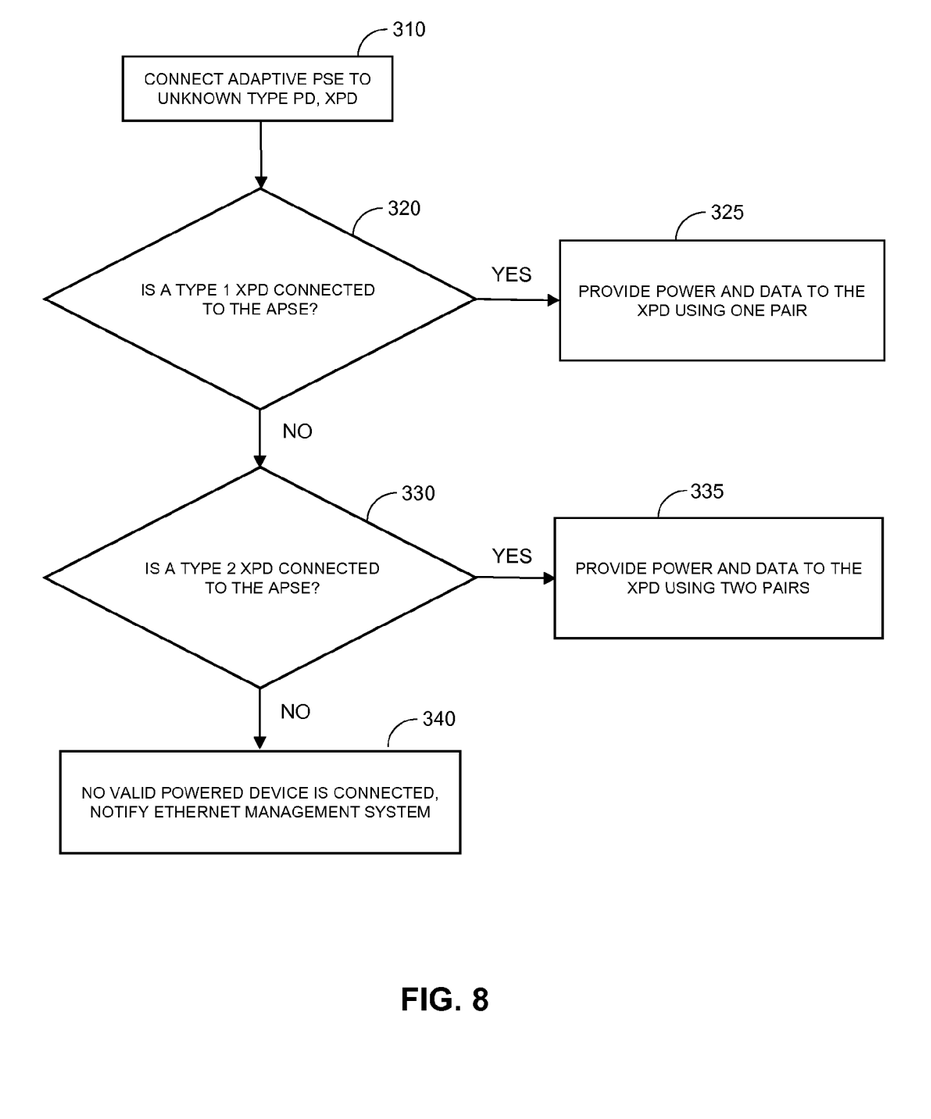
FIG. 8 is a flowchart illustrating an exemplary method of establishing communications between a powered device and adaptive power sourcing equipment.

An exemplary embodiment for establishing communication between an APSE 120 and an XPD 110 is depicted by FIG. 8. APSE 120 is connected to XPD 110, as shown in block 310. APSE 120 determines, via a detector 132, if a type-1 powered device is connected, as shown by block 320. If a type-1 powered device is connected, then power is provided to the powered device via one pair, as shown by block 325. However, if a type-1 powered device is not connected, then APSE 120 determines via detector 142, if a type-2 powered device is connected, a fourth step 330. If a type-2 powered device is connected, then a supply voltage is provided to the powered device via two wire pairs, as shown by block 335. If a type-2 powered device is not connected, then an Ethernet management system is notified.

Figure 9:
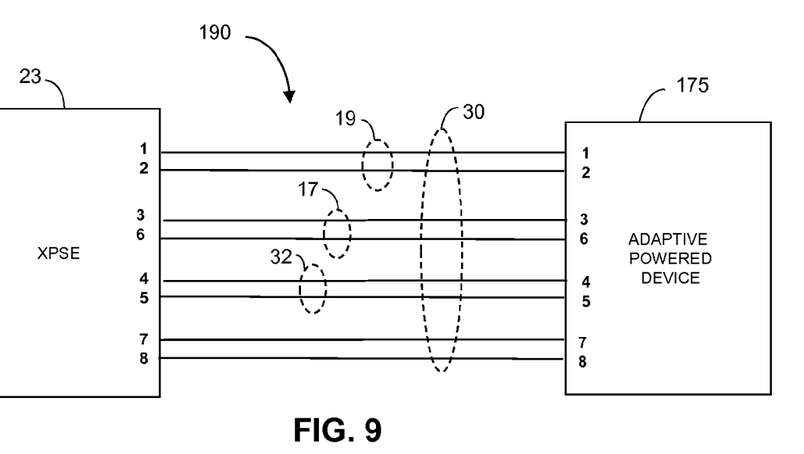
FIG. 9 is a block diagram depicting an exemplary embodiment of a powering system in accordance with the present disclosure.

FIG. 9 depicts an embodiment of a PoE system 190 in accordance with the present disclosure. A type-X PSE, XPSE 23, wherein X designates the type of PSE, is coupled by cable 30 to an adaptive PD, APD 175. For example, when the PSE is a type-1 equipment, X is "1" and when the PSE is a type-2 equipment X is "2". APD 175 is configured to accept power and data from either a type-1 PSE or a type-2 PSE. Upon detecting that APD 175 is a valid PD, the XPSE 23 applies a supply voltage, a DC voltage from a power supply, to the cable 30. The supply voltage is applied differentially to one pair 32 if the XPSE 23 is type 1 and is applied as a common mode connection to two pairs 17, 19 if the XPSE 23 is type-2. When the APD 175 receives the supply voltage from the XPSE 23, the supply voltage is converted to one or more voltages, referred to as a converter voltage, to power a load comprising communication circuits and other circuits. In other embodiments more than one converter voltage is provided to the load. When communication circuits of the APD 175 are activated, a transceiver of the APD 175 establishes communications over cable 30 with a transceiver of the PSE. The PoE system 190 is configured to apply a power voltage from either a type-1 power sourcing equipment or a type-2 power sourcing equipment to cable 30 for powering APD 175 and establishing data communications.

Figure 10:
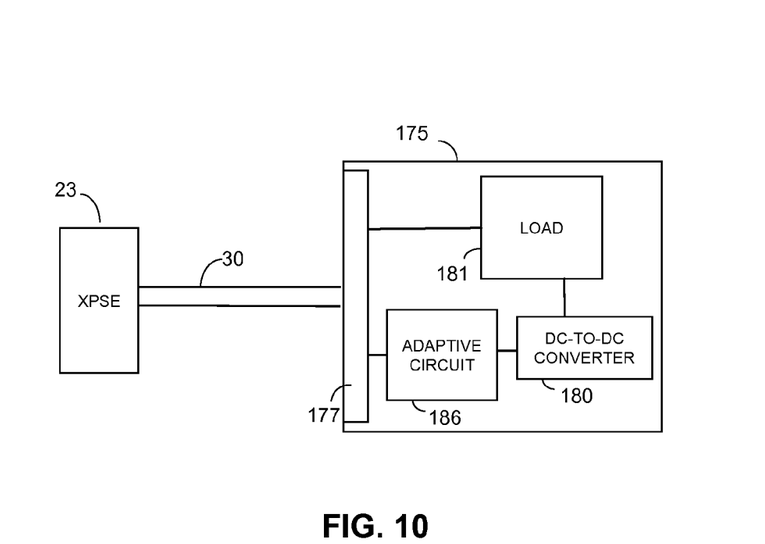
FIG. 10 depicts an exemplary embodiment of a powered device of the powering system of FIG. 9.

An embodiment of APD 175, as depicted in FIG. 10, comprises an interface 177, an adaptive circuit 186, a converter 180 and a load 181. Load 181 comprises communication and other circuits configured for transceiving data signals of PoE system 190. When components of system 190 are initially connected, XPSE 23 performs a PD detection operation to determine if a valid PD is connected to the XPSE 23 via cable 30. The detection operation is initiated when a probe voltage (a DC voltage of approximately 10 Volts) is applied to cable 30 by the XPSE 23. The XPSE 23 measures current flow caused by the probe voltage. If XPSE 23 determines that the measured current is in a predefined range, such as, for example, between 0.30 mA and 0.45 mA, then XPSE 23 indicates that a valid PD is detected. If XPSE 23 detects a valid PD, XPSE 23 applies a supply voltage to cable 30. The supply voltage is coupled over cable 30 through interface 177 to adaptive circuit 186. Adaptive circuit 186 couples the supply voltage with a desired polarity to converter 180. The converter 180 converts the supply voltage to one or more converter voltages, an output of the converter, and applies the converter voltage to load 180. The converter voltage activates its communication circuits of load 180 and the communication circuits establish a communication link over cable 30 with communication circuits of the XPSE 23. The supply voltage and probe voltage applied by XPSE 23 to cable 30 have values specified in a standard, such as an IEEE Ethernet standard. The supply voltage and the probe voltage are differentially coupled over one pair 32 or over the two pairs 17, 19 in a common mode connection. Interface circuit 177 is configured to provide DC paths from cable 30 to adaptive circuit 186. Adaptive circuit 186 is configured to provide a detection resistance, e.g., 25 kΩ, to either a type-1 or type-2 of PSE and to couple a supply voltage to the converter 180.

Figure 11:
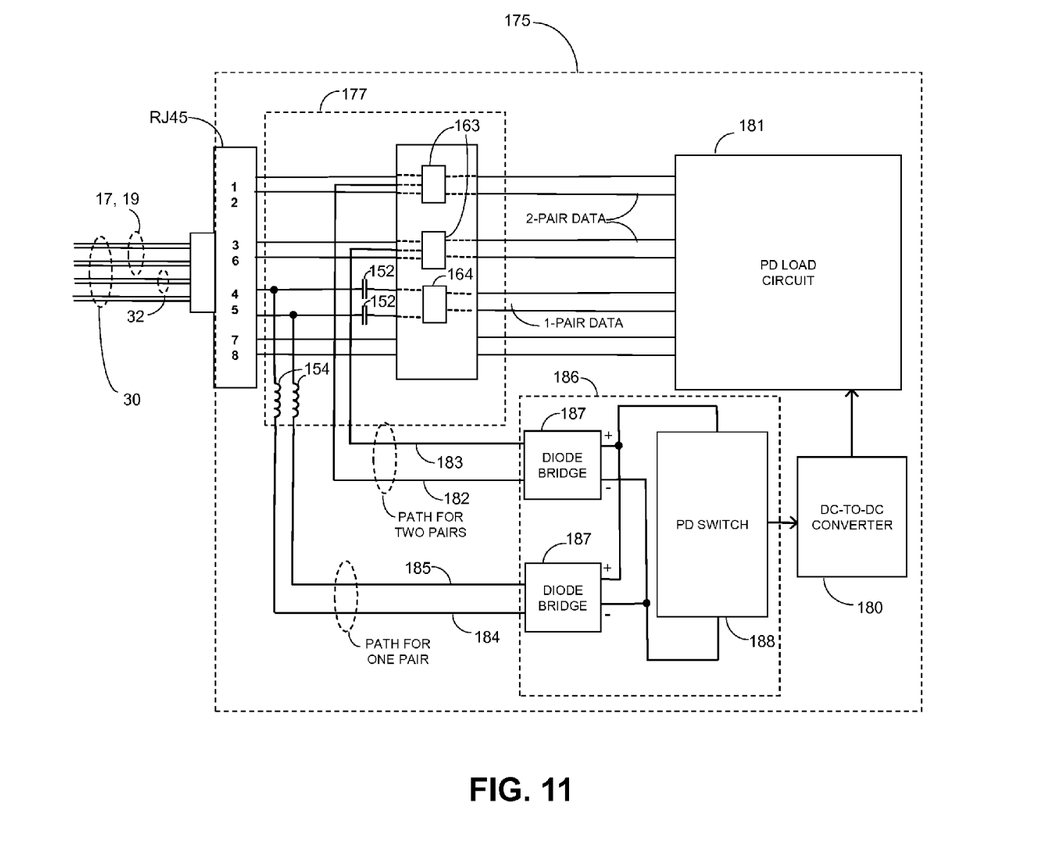
FIG. 11 depicts an exemplary embodiment of a powered device of the powering system of FIG. 9.

FIG. 11 depicts an exemplary embodiment of APD 175. Cable 30 extending from a PSE is coupled to APD 175 by a connector, such as an RJ45, and wire pairs of the cable are coupled to interface 177. Interface 177 provides DC connections to adaptive circuit 186 and data connections via transformers to communication circuits (not shown) of load 181. APD 175 functions as a type-1 PD when the PSE is type 1 and as a type-2 PD when the PSE is type 2.

Consider now the scenario where APD 175 functions as a valid PD to a type-1 PSE. The type-1 PSE applies a probe voltage to one pair 32, wires 4 and 5 of cable 30 to determine if a valid type-1 PD is connected. The connector RJ45 couples wires 4 and 5 of cable 30 through inductors 154 to conductors 184 and 185. Conductors 184 and 185 provide a DC path from the connector to an input of the adaptive circuit 186. The probe voltage across conductors 184 and 185 is applied to a diode bridge 187 of the adaptive circuit 186. The diode bridge 187 ensures that the voltages across conductors 184 and 185 are transferred to the PD switch 188 with a consistent polarity. The PD switch 188 provides a detection resistance to the probe voltage enabling the type-1 PSE to detect a valid PD. If the current in the one pair, measured by the type-1 PSE and resulting from the probe voltage being applied across the detection resistance, falls within a predefined range then a valid PD is detected. The arrangement of circuit elements for PD switch 188 are well known to those in the art and such a switch is available from several data communication circuit vendors.

When the type-1 PSE detects a valid PD, the type-1 PSE removes the probe voltage and applies a supply voltage to wires 4 and 5 of cable 30. The supply voltage is coupled from wires 4 and 5 of cable 30 through interface 177 of APD 175 to conductors 184 and 185. The supply voltage on conductors 184 and 185 is received the adaptive circuit 186. The adaptive circuit 186 provides a conduction path to converter 180 so that the supply voltage becomes an input to the converter 180. Converter 180 converts the supply voltage to one or more converter output voltages, collectively referred to as a converter voltage, for powering load 181. When the converter voltage is applied to load 181 communication circuits and other circuits of the load are activated. The activated communication circuits transceive data signals through transformer 164 over one pair 32 of cable 30 with respective communication circuits of the type-1 PSE. Conductors 184 and 185 provide the DC path for the probe signal and the supply voltage of the type-1 PSE and couple these DC voltages to adaptive circuit 186. Because the adaptive circuit 186 is configured to provide type-1 PD functionality, APD 175 appears as a type-1 PD to a type-1 PSE. When data is transferred between the type-1 PSE and APD 175 over cable 30, one pair 32 functions as both a power path and a data pair.

When APD 175 is implemented as a type-2 PD, wire pairs 17 and 19 of cable 30 are coupled to center tap transformers 163 of interface 177 as depicted in FIG. 11. At the APD 175, ends of wires 1 and 2, pair 19, of cable 30 DC converges, via a cable-side transformer winding of one center-tap transformer 163, to a center wire of that center-tap transformer 163. The center wire of that center-tap transformer 163 is connected to an end of conductor 182 forming a DC node that is connected on conductor 182 to an input of adaptive circuit 186. At the APD 175, ends of wires 3 and 6, pair 17, of cable 30 DC converges, via a cable-side transformer winding of another center-tap transformer 163, to a center wire of that center-tap transformer 163. The center wire of that center-tap transformer 163 is connected to an end of conductor 183 forming a DC node that is connected on conductor 183 to another input of adaptive circuit 186. When a type-2 PSE, connected by cable 30 to APD 175, applies a probe voltage in a common mode connection to two pairs 19, 17, the probe voltage is coupled to the adaptive circuit 186 over the path provided by conductors 182 and 183. The adaptive circuit 186 connects a detection resistor, e.g., 25 kΩ, across conductors 182 and 183. If a detector in the type-2 PSE determines that the resulting current flow caused by the probe voltage is in a predefined range, then the detector indicates that a valid type-2 PD is attached. When the detector indicates there is a valid type-2 PD, the type-2 PSE applies a supply voltage, such as, for example, 50 Volts DC, in a common mode connection to two pairs 19, 17. The supply voltage received over the two pairs 19, 17 by the ADP 175 is applied to adaptive circuit 186 over conductors 182 and 183. The adaptive circuit 186 connects the supply voltage on conductors 182 and 183 to the input of the converter 180. The converter 180 converters the supply voltage to a converter voltage for powering the load 181. The applied converter voltage activates communication circuits of the load 181. The activated communication circuits of load 181 establish data communications over cable 30 with respective communication circuits in the type-2 PSE. When data communications is established between the type-2 PSE and APD 175 over cable 30, two pairs 19, 17 function as a common mode path for the supply voltage and as two differential paths for data signals.

Figure 12:
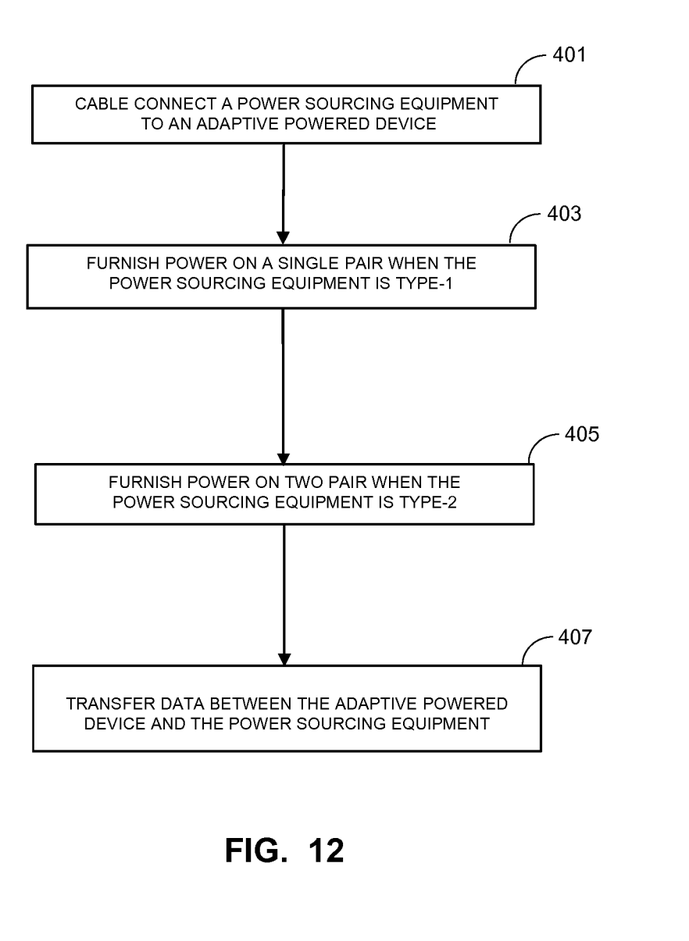
FIG. 12 is a flowchart illustrating an exemplary method of establishing communications between power sourcing equipment and a powered device.

An exemplary embodiment for establishing communication between an XPSE 23 and an APD 175 is depicted by FIG. 12. An unknown type of PSE, XPSE 23, is connected via cable 30 to APD 175. When APD 175 is connected to XPSE 23, then a connection is established, as shown by block 401. If XPSE 23 detects a valid type-1 PD attached to the cable, then a supply voltage is sent to APD 175 over one pair 32, as shown by block 403. If XPSE 23 detects a valid type-2 PD attached to the cable, then a supply voltage is send to APD 175 in a common mode connection over two pairs 17 and 19, as shown by block 405. The supply voltage is applied to a converter and communications circuits are activated. Data is then transferred over cable 30 between APD 175 and XPSE 23, as shown by block 407.

Figure 13:
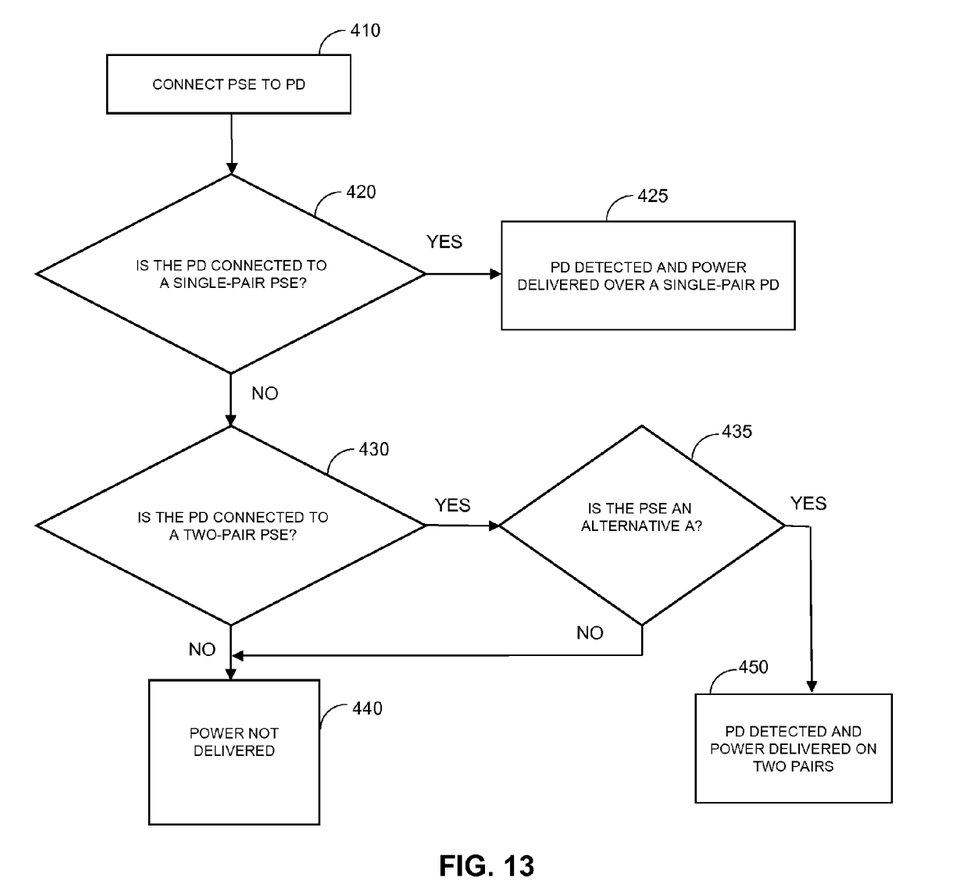
FIG. 13 is a flowchart illustrating an exemplary method of establishing communications between power sourcing equipment and a powered device.

An exemplary embodiment for establishing communication between an XPSE 23 and an APD 175 is depicted by FIG. 13. The XPSE 23 is connected to the APD 175, as shown in block 410. If the XPSE 23 a type-1 power sourcing equipment, then the APD 175 connects to the power sourcing equipment as a type-1 powered device and the powered device receives power over one pair, as shown by the YES path in block 420 and block 425. If the XPSE 23 is a type-2 PSE, then a supply voltage from the XPSE 23 is sent over two pairs, as shown by the YES path of block 430, the YES path of block 435 and block 450. If the power sourcing equipment is type-2 and not of type alternative A (as described in an IEEE standard), then power is not delivered as shown by the NO path of block 435 and block 440. If the PSE is not a type-1 or a type-2 equipment, power is not delivered, as shown by the NO path of block 420, the NO path of block 430, and block 440. When power is delivered to APD 175 one-pair 32 or two pairs 17 and 19, the communication circuits are activated by a supply voltage from XPSE 23 and data transfer is available over cable 30.

Another exemplary embodiment for establishing communication comprises connecting the APSE 120 of FIG. 4 via cable 30 to the APD 175 of FIG. 9. The APSE 175 is configured, as previously described, to detect either a type-1 PD or a type-2 PD. When a type-1 PD is detected by APSE 120, then a power voltage and a data signal are connected on one pair, such as pair 32. When a type-2 PD is detected by the APSE 120, then a power voltage is common mode connected to two pairs, such as two pairs 19, 17 and data signals are differential mode connected to the same two pairs. Because the APD 175 simultaneously functions as a type-1 PD and a type-2 PD, the APSE 120 determines that a type-1 PD is connected and a type-2 PD is connected. The APSE 120 may then use three pairs, 32, 19 and 17 for power transfer and data transfer. In such a connection, a power voltage of the APSE is connected differentially to one pair 32 and is common mode connected to two pairs 17, 19. Data signals are applied to each of the wire pairs 32, 19 and 17 in a differential mode connection.

One advantage of the foregoing embodiment is that power may continue to be provided to the APD 175 and communication may continue between the APSE 120 and APD 175 in the event of a failure that would otherwise prevent the PD from receiving power and communicating if it was a type-1 or a type-2 PD only. As an example, assume that pair 32 is severed such that power and data cannot be delivered over such pair 32. If the APD 175 functions as a type-1 PD only, then severance of the pair 32 would prevent power and data from being delivered to the APD 175. However, since the APD 175 also functions as a type-2 PD in the foregoing embodiment, power and data may continue to be delivered via the pairs 17 and 19. Conversely if pairs 17 and/or 19 are severed, then power and data may continue to be delivered via pair 32. Thus, having the APD 175 function as both a type-1 PD and a type-PD permits the system to withstand various types of failures that would otherwise prevent power and data being delivered to the APD 175.

Figure 14:
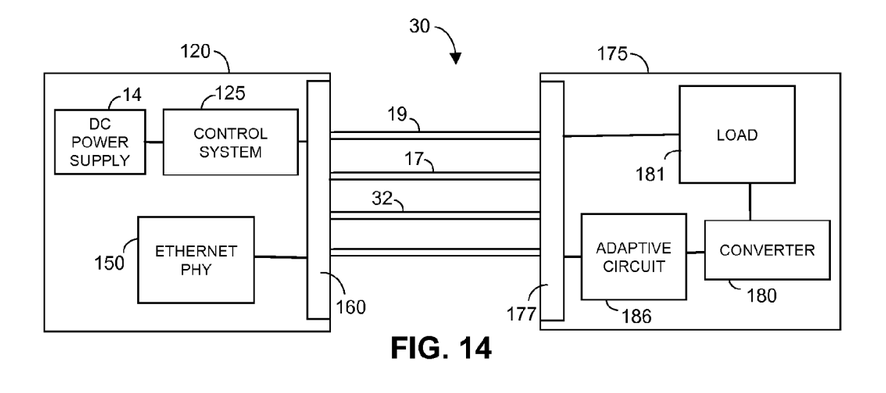
FIG. 14 depicts an exemplary embodiment of a communication system where power sourcing equipment of FIG. 5 is coupled to powered device of FIG. 10.

An exemplary embodiment for establishing communication between an APSE 120 and an APD 175 is depicted by FIG. 14. When the devices depicted in FIG. 14 are connected via cable 30, the control system 125 of the APSE 120 sends a probe voltage over one pair 32 to determine if a type-1 PD or a type-2 PD is connected to the cable 30. Since the APD 175, as previously described, functions as a type-1 device when a probe voltage is applied to one pair 32, then the control system 125 determines a type-1 PD is connected to the cable 30. The control system 125 of the APSE 120 also applies a probe voltage to two pairs 17 and 19 to detect the presence of a type-2 PD. Since APD 175, as previously described, also functions as a type-2 PD, the control system 125 detects a type-2 PD is connected to the cable 30. Control system 125 then applies a supply voltage to one pair 32 and a supply voltage to two pairs 17 and 19 through interface 160. Supply voltages applied to the one pair 32 and the two pair 17 and 19 and coupled to power converter 180 through interface 177 and adaptive circuit 186. The converter 180 converters the supply voltages to a converter voltage, an output of the converter 180, to activate communication circuits of the load 181. When the communication circuits of the APD 175 are activated a communication connection over cable 30 with respective communication circuits in the APSE120.

In case a supply voltage is not available from one pair 32 due to faulty connection or otherwise, power for APD 175 remains available over the two pairs 17 and 19. Hence, the two pairs 17 and 19 provide power so that the communication system continues to transfer data. In case the supply voltage is not available over two pair 17 and 19 due to a faulty connection or otherwise, power is still available over one pair 32 and the communication system remains functional. The communication system provided when the APSE 120 is connected to the APD 175 over cable 30 has improved reliability relative to conventional Ethernet communication systems having power sourcing equipment connected by a cable to a powered device.

Figure 15:
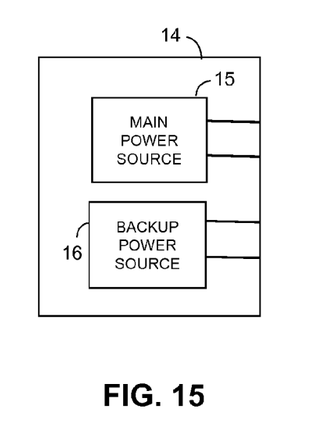
FIG. 15 depicts an exemplary embodiment of a power supply of the present disclosure.

The power supply 14 of the APSE 120 of FIG. 6 depicts the power supply 14 as one power source. In other embodiments, the power supply 14 comprises a main power source 15 and a backup power source 16 as depicted in FIG. 15. In one embodiment for establishing communications, the main power source 15 is coupled to two pairs 19 and 17 and the backup power source 16 is coupled to the one pair 32. In other embodiments other numbers of power sources are possible and other connection arrangements are possible. The connection of an APSE 120 to an APD 175 over a cable having multiple wire pairs and multiple types of devices is possible for other embodiments. Connecting an APSE 120 to an APD 175 increases the reliability of a data communication system.

The APSE 120 and APD 175 of the disclosure are described as elements of Ethernet communication systems wherein type-1 and type-2 devices are described in relevant Ethernet standards. Embodiments of other communication systems having other types of power sourcing equipment connected via other cables to other types of powered devices incorporate the principals described herein. In such other embodiments there are other numbers of wire pairs, wherein all or a portion of the wire pairs are used for data and power transfer. In other embodiments it is possible to transfer data on some pairs, power on other pairs and both data and power on other pairs. Power sourcing equipment configured to detect more than one type of powered device is not limited to Ethernet communications systems. Further, powered devices that are configured to simultaneously function as multiple types of devices are not limited to Ethernet communication systems.

Figure 16:
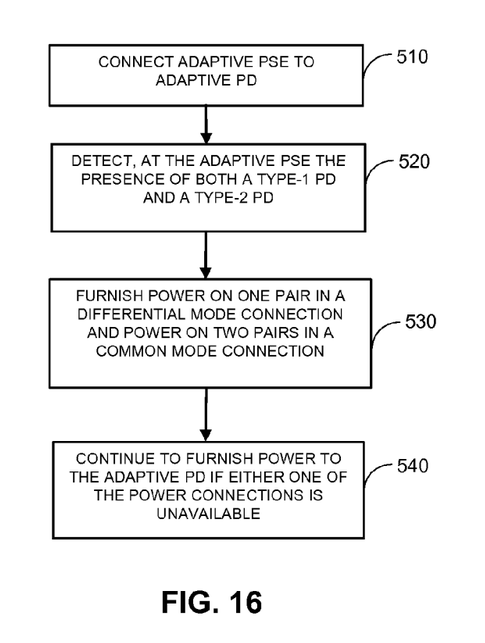
FIG. 16 is a flowchart illustrating an exemplary method of establishing communication between power sourcing equipment and a powered device.

An exemplary embodiment for establishing communication between an APSE 120 and an APD 175 is depicted by FIG. 16. APSE 120 is connected to APD 175, as shown in block 510. APSE 120 determines, via control system 125, if a type-1 powered device is connected; and APSE 120 also detects, via control system 125 if a type-2 powered device is connected, as shown by block 520. Since APD 110 is configured to appear as both a type-1 powered device and a type-2 powered device, then power is furnished differentially on one pair 32 and on two pairs 17 and 19 in a common mode connection, as shown in block 530. If either one of the power delivery arrangements fails, then the other power arrangement provides power, as shown in block 540. For example, if power over the one pair 32 fails, then power will still be delivered over the two pair 17, 19.

It should be noted that various changes and modifications to the exemplary embodiments described above are possible. For example, if another type powered device is connected to the Ethernet switch, another controller (not shown) could be incorporated to form an adaptive controller that provides power to such another type of powered device.

Now, therefore, the following is claimed:

1. A power sourcing equipment for supplying power to and communicating data with a powered device over a cable, the power sourcing equipment comprising:
   a power supply for providing power to the powered device; and
   a control system configured to sense whether the powered device is a first type for receiving power over a first twisted wire pair coupled between the power sourcing equipment and the powered device, the control system configured to sense whether the powered device is a second type for receiving power over second and third twisted wire pairs coupled between the power sourcing equipment and the powered device, the control system configured to connect the power supply to the first twisted wire pair of the cable, if the powered device is the first type, such that a first voltage from the power supply is applied to a first wire of the first twisted wire pair and a second voltage from the power supply is applied to a second wire of the first twisted wire pair, the control system further configured to connect the first voltage to the second twisted wire pair and the second voltage to the third twisted wire pair if the powered device is the second type,
   wherein the second voltage is different than the first voltage, and wherein the powered device is configured to activate a communication circuit of the powered device via power from the power supply, and wherein the communication circuit is configured to communicate data over the cable.

2. The powering sourcing equipment of claim 1, wherein the control system comprises a first controller configured to sense whether the powered device is the first type and a second controller configured to sense whether the powered device is the second type.

3. The powering sourcing equipment of claim 1, wherein the first voltage and second voltage are coupled to the cable over an interface circuit configured to connect the power supply to the first wire pair differentially and to the second and third wire pairs in a common mode connection.

4. The powering sourcing equipment of claim 1, wherein the first type corresponds to a type-1 Ethernet powered device and the second type corresponds to a type-2 Ethernet powered device.

5. The powering sourcing equipment of claim 1, wherein inductors are positioned between the power supply and the first wire pair to prevent data feedback.

6. The powering sourcing equipment of claim 1, wherein the power sourcing equipment is configured to communicate data via the first wire pair if the control system senses the powered device to be the first type and to communicate data via the second and third wire pairs if the control system senses the powered device to be the second type.

7. A communication system, comprising:
   a powered device having communication circuits; and
   a power sourcing equipment connected via a cable to a powered device, the cable having a first twisted wire pair, a second twisted wire pair, and a third twisted wire pair, the first twisted wire pair having a first wire and a second wire, the power sourcing equipment configured to detect if the powered device is a first type and to apply (1) a first voltage of a power supply to a first wire of the first twisted wire pair and (2) a second voltage of the power supply to a second wire of the first twisted wire pair, if the powered device is detected to be the first type, wherein the first voltage is different than the second voltage, the power sourcing equipment further configured to detect if the powered device is a second type and to apply the first and second voltages to the second and third twisted wire pairs, respectively, if the powered device is detected to be the second type,
   wherein the communication circuits are activated by power from the power sourcing equipment, and wherein the communication circuits are configured to establish communication with the power sourcing equipment via the cable.

8. The communication system of claim 7, wherein the first voltage, the second voltage and a data signal are coupled between the power sourcing equipment and the powered device over the first wire pair of the cable.

9. The communication system of claim 7, wherein the communication circuits comprise an Ethernet transmitter and an Ethernet receiver.

10. A method of furnishing power to a powered device, comprising:
    determining if the powered device is a first type for receiving power via a first twisted wire pair of a cable coupled to the powered device;
    applying a first voltage to a first wire of the first twisted wire pair and a second voltage to a second wire of the first twisted wire pair, if the powered device is determined to be the first type, wherein the second voltage is different than the first voltage;
    determining if the powered device is a second type for receiving power via second and third twisted wire pairs of the cable; and
    applying the first voltage to the second twisted wire pair and the second voltage to the third twisted wire pair if the powered device is determined to be the second type.

11. The method of claim 10, further comprising generating a notification signal if the powered device is determined not to be the first type and if the powered device is determined not to be the second type.

12. The method of claim 10, wherein the determining if the powered device is the first type comprises applying a probe voltage to the first wire pair and determining if current resulting from the probe voltage falls below a threshold.

13. A power sourcing equipment connected by a cable to a powered device, the power sourcing equipment comprising:
    a power supply;
    a first controller configured to connect (1) a first voltage of the power supply to a first wire of a first twisted wire pair of the cable and (2) a second voltage of the power supply to a second wire of the first twisted wire pair, if the first controller detects the powered device to be a first type for receiving power via the first twisted wire pair, wherein the first voltage is different than the second voltage;
    a second controller configured to connect (1) the first voltage of the power supply to a second twisted wire pair of the cable and (2) the second voltage of the power supply to a third twisted wire pair of the cable, if the second controller detects the powered device to be a second type for receiving power via the second and third twisted wire pairs; and
    communication circuits configured to communicate data with the powered device via the cable.

14. The power sourcing equipment of claim 13, wherein the power sourcing equipment is configured to apply a probe voltage to the first twisted wire pair, and wherein the first controller is configured to detect that the powered device is the first type if current from the first twisted wire pair produced by the probe voltage falls below a threshold.

15. The power sourcing equipment of claim 13, wherein the power sourcing equipment is configured to apply a probe voltage to the second twisted wire pair and the third twisted pair, wherein the second controller is configured to detect that the powered device is the second type if current from the second twisted wire pair produced by the probe voltage falls below a threshold.

16. The power sourcing equipment of claim 13, further comprising inductors positioned between the first twisted wire pair and the power supply for preventing data signals from coupling to the power supply.

17. The power sourcing equipment of claim 13, further comprising data transformers for coupling data signals on the cable to transceivers of the power sourcing equipment.

18. The power sourcing equipment of claim 13, wherein the first controller is configured to electrically isolate the power supply from the first and second wires if the second controller detects the powered device to be the second type.

19. The power sourcing equipment of claim 1, wherein the control system is configured to electrically isolate the power supply from the first twisted wire pair if the powered device is the second type and to electrically isolate the power supply from the second and third twisted wire pairs if the powered device is the first type.

20. The power sourcing equipment of claim 1, wherein the control system comprises a first power switch coupled between the power supply and the first twisted wire pair, the first power switch configured to electrically isolate the power supply from the first twisted wire pair if the powered device is the second type.

21. The power sourcing equipment of claim 20, wherein the control system comprises a second power switch coupled between the power supply and the second and third twisted wire pairs, the second power switch configured to electrically isolate the power supply from the second and third wire pairs if the powered device is the first type.

22. The power source equipment of claim 21, wherein the power sourcing equipment is configured to communicate data with the powered device via the first twisted wire pair while the supply voltage is connected to the first twisted wire pair if the powered device is the first type.

23. The communication system of claim 7, wherein the power sourcing equipment is configured to prevent application of the first and second voltages to the first twisted wire pair if the powered device is the second type and to prevent application of the first and second voltages to the second and third twisted wire pairs if the powered device is the first type.

24. The communication system of claim 7, wherein the power sourcing equipment comprises a first power switch coupled between the power supply and the first twisted wire pair, the first power switch configured to electrically isolate the power supply from the first twisted wire pair if the powered device is the second type.

25. The communication system of claim 24, wherein the power sourcing equipment comprises a second power switch coupled between the power supply and the second and third twisted wire pairs, the second power switch configured to electrically isolate the power supply from the second and third twisted wire pairs if the powered device is the first type.

26. The method of claim 10, further comprising:
providing the first voltage and the second voltage via a power supply; and
electrically isolating the first and second wires from the power supply if the powered device is the second type.

* * * * *